US008191506B2

(12) United States Patent
Caldenius

(10) Patent No.: US 8,191,506 B2
(45) Date of Patent: Jun. 5, 2012

(54) MILKING SYSTEM AND METHOD FOR GENERATING AND COMMUNICATING ERROR MESSAGES IN SUCH A MILKING SYSTEM

(75) Inventor: Thomas Caldenius, Västerhaninge (SE)

(73) Assignee: DeLaval Holding AB, Tumba (SE)

( * ) Notice: Subject to any disclaimer, the term of this patent is extended or adjusted under 35 U.S.C. 154(b) by 44 days.

(21) Appl. No.: 12/086,531

(22) PCT Filed: Dec. 13, 2006

(86) PCT No.: PCT/SE2006/001419
§ 371 (c)(1),
(2), (4) Date: Sep. 22, 2008

(87) PCT Pub. No.: WO2007/069982
PCT Pub. Date: Jun. 21, 2007

(65) Prior Publication Data
US 2009/0145363 A1 Jun. 11, 2009

(30) Foreign Application Priority Data
Dec. 16, 2005 (SE) ...................................... 0502788

(51) Int. Cl.
*A01J 5/007* (2006.01)
(52) U.S. Cl. ................. 119/14.08; 119/14.02; 119/14.18
(58) Field of Classification Search .................. 119/14.2, 119/14.01, 14.02, 14.03, 14.14, 14.15, 14.18, 119/14.08
See application file for complete search history.

(56) References Cited

U.S. PATENT DOCUMENTS

| 5,842,436 A * | 12/1998 | van der Lely ............... 119/14.08 |
| 6,332,327 B1 | 12/2001 | Street et al. |
| 2002/0007798 A1* | 1/2002 | Pavlak et al. ............... 119/51.01 |
| 2005/0274326 A1* | 12/2005 | Stellnert et al. ............ 119/14.08 |
| 2007/0005201 A1* | 1/2007 | Chenn .............................. 701/29 |
| 2007/0272159 A1* | 11/2007 | Francke et al. ............. 119/14.14 |

FOREIGN PATENT DOCUMENTS

| EP | 0857418 | 8/1998 |
| EP | 1212938 | 6/2002 |
| GB | 2208261 | 3/1989 |
| WO | WO 99/32077 | * 6/1999 |

* cited by examiner

Primary Examiner — Rob Swiatek
Assistant Examiner — Lisa Tsang
(74) Attorney, Agent, or Firm — Young & Thompson

(57) ABSTRACT

A milking system comprises a plurality of apparatuses (11a-g), wherein each of the apparatuses comprises a device (12a-g) for performing an action related to the operation of the milking system; a microprocessor (13a-g); an error message generating system (14a-g) for generating error messages (21) about errors that have occurred in the apparatus; and means (15a-g) for communicating said error messages to all other ones of the apparatuses. Each of the error messages comprises information, preferably categorized information, regarding the nature (22) and severity (23) and optionally physical location of the error and is interpretable by all other ones of the apparatuses.

20 Claims, 2 Drawing Sheets

MILKING SYSTEM AND METHOD FOR GENERATING AND COMMUNICATING ERROR MESSAGES IN SUCH A MILKING SYSTEM

TECHNICAL FIELD OF THE INVENTION

The present invention generally relates to dairy farm systems and particularly the invention relates to a milking system and to a method for generating and communicating error messages in such a milking system.

DESCRIPTION OF RELATED ART AND BACKGROUND OF THE INVENTION

Swedish patent application No. 9903339-1 discloses an arrangement for automatically error notifying a user of an automatic dairy farm system having a fault detection means and fault indicating signal generating means, and the user being located remote from the automatic dairy farm system. The arrangement receives a fault indicating signal from the automatic dairy farm system, the fault indicating signal corresponding to a particular fault detected by the automatic dairy farm system, and in dependence on the fault indicating signal calls a predetermined telephone number and sends to the called number an error notification voice message informing of the particular fault.

EP 1212938 B1 describes a milking system comprising a computer coupled to other farming systems, such as an animal identification system, a milking device and an automatic feeding device, the other farming systems being arranged for generating and supplying error information to the computer about an error message generated in the respective farming systems, wherein, optionally, in the computer, per animal, information is stored about an identity of the animal together with the associated animal information, the computer being arranged for indicating an animal when the animal information belonging to the respective animal does not meet predetermined standards and/or when, conversely, no animal information is received which meets predetermined standards, the computer optionally being arranged for generating error information about an error message generated in the computer itself. A farm management system is arranged to effect in an automatic manner a communication connection for sending alarm information to a predetermined device with at least one predetermined mobile communication apparatus when at least one of the animals is indicated and/or when at least one of the farming systems or the computer generates error information about at least one predetermined error message.

SUMMARY OF THE INVENTION

While the above arrangements solve problems of whom to inform in case a farming system generates and supplies error information to a computer about an error message generated in the farming system, they fail to provide a unified error generation and communication system for the respective farming systems or apparatuses. Further, at least the system of EP 1212938 B1 relies on a main computer for communication of alarm information and for initiating animal-related actions.

It is thus an object of the present invention to provide a milking system comprising a plurality of interconnected farm subsystems or apparatuses, which lacks the drawbacks of the prior art systems.

It is a further object of the invention to provide such a milking system, which facilitates for the addition or removal of subsystems or apparatuses.

It is still a further object of the invention to provide such a milking system, which is capable of reporting errors also in case a main computer of the system is out of operation.

It is yet a further object of the invention to provide such a milking system, which relaxes the demands on the capacity of any main computer comprised in the system.

It is still a further object of the invention to provide such a milking system, which is flexible, reliable, easy to maintain and trouble-shoot, and of reasonably-low cost.

These objects, among others, are according to the present invention attained by milking systems as claimed in the appended patent claims.

By the provision of a plurality of interconnected farm subsystems or apparatuses, wherein each of the apparatuses comprises a device for performing an action related to the operation of the milking system, a microprocessor, an error message generating system or module for generating error messages about errors that have occurred in the apparatus, and an arrangement for communicating the error messages to all other ones of the apparatuses, wherein each of the error messages comprises information regarding the nature and severity of the error and is interpretable by all other ones of the apparatuses, a flexible and reliable milking system is achieved.

The milking system of the present invention is a system with distributed intelligence based on the sharing of information among the apparatuses. It has a modular design which facilitates the removal or addition of subsystems or apparatuses.

Preferably, each of the error messages comprises categorized information regarding the nature of the error and categorized information regarding the severity of the error. Further, each of the error messages may comprise information, advantageously categorized information, regarding the physical location of the error. By such provisions, each of the apparatuses may be able to interpret the error messages, and to interpret their nature and severity, and optionally their location.

The messages are preferably generated in a standardized or unified manner to further facilitate the interpretation of the error messages as well as the removal or addition of subsystems or apparatuses.

By the provision of the present invention each subsystem or apparatus may be capable of interpreting an error message, and particularly to deduce whether the corresponding error affects its own operation, or the operation of the entire milking system.

A further object of the invention is to provide a method for generating and communicating error messages in a milking system of the above kind.

A method of the present invention that attains the above object comprises the steps of: in each of the apparatuses generating, by means of the error message generating system of the apparatus, error messages about errors that have occurred in the apparatus, and communicating the error messages to all other ones of the apparatuses, where each of the error messages comprises information regarding the nature and severity of the error and is interpretable by all other ones of the apparatuses.

Further characteristics of the invention and advantages thereof will be evident from the following detailed description of embodiments of the invention given herein below and from the accompanying FIGS. 1-3, which are given by way of illustration only, and thus are not limitative of the present invention.

In the detailed description the milk-producing animals are cows. However, the invention is not limited to milking systems for cows, but is applicable to milking systems for any animals having the capability to produce large quantities of milk, such as sheep, goats, buffaloes, horses, etc.

DETAILED DESCRIPTION OF EMBODIMENTS

Figure 1:
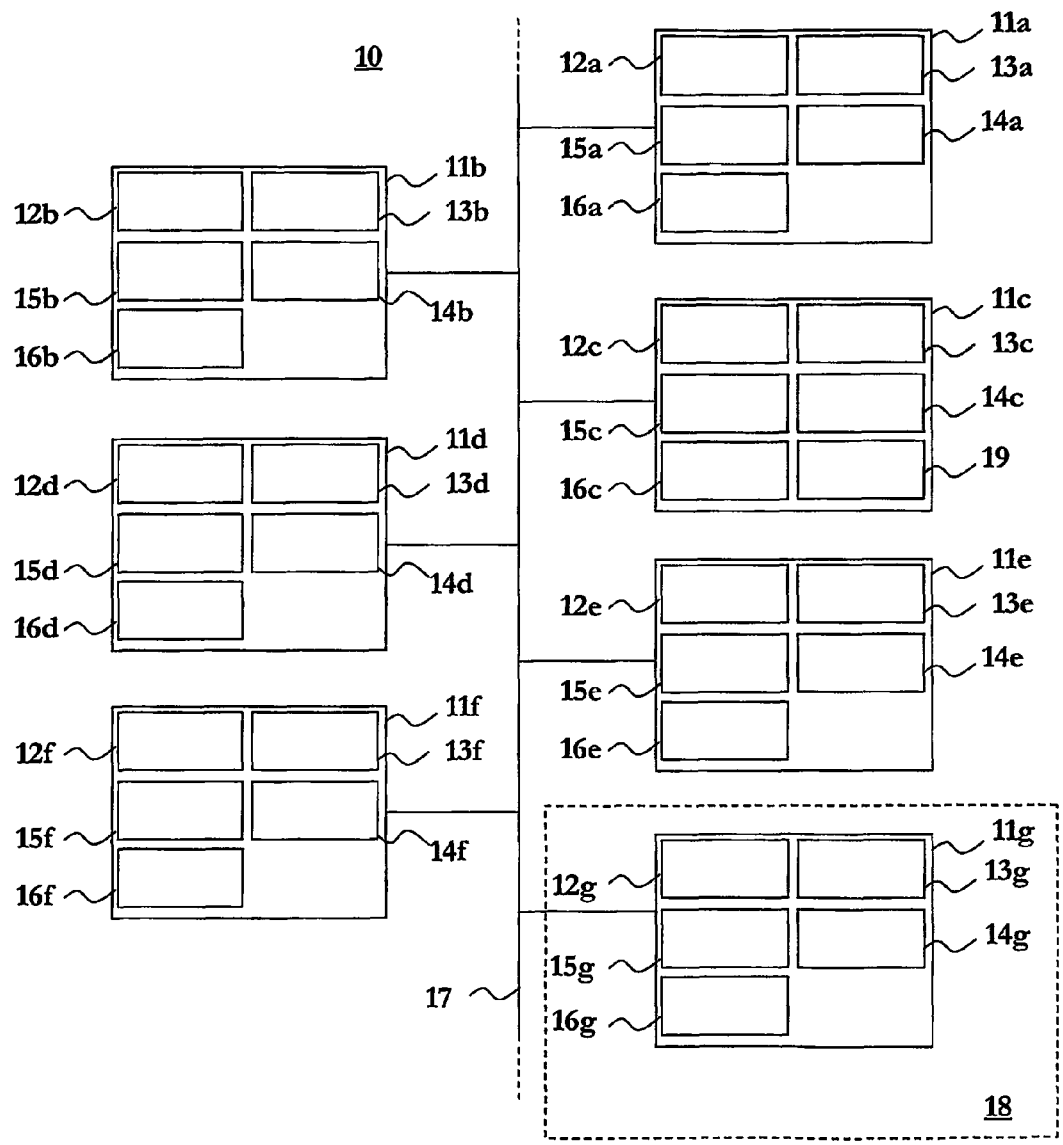
FIG. 1 illustrates, in a schematic block diagram, a milking system according to an embodiment of the invention.

FIG. 1 shows an automated milking system 10 comprising a plurality of subsystems or apparatuses 11a-g interconnected on a bus 17. As an non-limiting example, 11a may denote a vacuum source, 11b may denote a milking machine and/or a milking robot or milk extraction equipment for a milking point, 11c may denote a herd management system, 11d may denote a washing machine, 11e may denote a cooling tank, 11f may denote a communication apparatus for remote communication, and 11g may denote a gate system or a feeding system. It shall, however, be appreciated that there may be more subsystems or apparatuses in the milking system.

Each of the apparatuses 11a-g comprises a device 12a-g for performing an action related to the operation of the milking system, a microprocessor 13a-g, an error message generating system or module 14a-g for generating error messages about errors that have occurred in the apparatus, and a communication arrangement 15a-g.

Non-limiting examples of device 12a-g for performing an action related to the operation of the milking system are listed in the Table I below. Note that the examples below are only there to illustrate the present invention; many more examples may naturally be given.

TABLE I

Examples of apparatuses and devices for performing an action related to the operation of the milking system.

| Apparatus | Device for performing an action |
|---|---|
| Vacuum source | Switch for switching on/off vacuum source and/or for switching to substitute vacuum source |
| Milking machine | Switch for initiating milking and/or for redirecting milk |
| Milking robot | Robot arm for fetching and attaching teat cups |
| Milk extraction equipment | Switch for applying vacuum to milk extraction equipment |
| Herd management system | Module for adjusting milking or feeding |
| Washing machine | Device for supplying cleaning fluid |
| Cooling tank | Cooler for increasing/decreasing temperature |
| Communication apparatus | Module for initiating an alarm |
| Gate system | Control device for opening/closing gates to direct or redirect animals |
| Feeding system | Feed supply device |

The microprocessor 13a-g, the error message generating system 14a-g, and the communication arrangement 15a-g in each of the apparatuses may be comprised of a microcomputer provided with memory and suitable software. However, the error message generating system 14a-g as well as the communication arrangement 15a-g may in each or in some of the apparatuses be separate devices. For example, the communication arrangements 15a-g may be any kind of wired or wireless devices.

Figure 2:
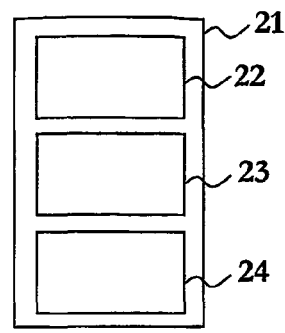
FIG. 2 illustrates, in a schematic block diagram, the contents of an error message as being generated and communicated in the milking system of FIG. 1.

The format of an error message 21 is shown in FIG. 2. Each of the error messages that is generated by the error message generating systems 14a-g comprises information 22 regarding the nature and information 23 regarding the severity of the error and is interpretable by all other ones of the apparatuses 11a-g. Preferably, each of the error messages 21 comprises categorized information regarding the nature of the error and categorized information regarding the severity of the error.

Categorized information regarding the nature of the error may be given as one or several figures, where each figure implies an error of a given kind such as an electrical error, a mechanical error, a software error, a pressure error, a milking error, a feeding error, etc.

Categorized information regarding the severity of the error may be given as a figure from e.g. 1 to 7 where the severity is augmenting from 1 (lowest severity) to 7 (highest severity).

Further, each of the error messages 21 may comprise information 24, preferably categorized information, regarding the physical location of the error. Other information regarding the error may also be included—in plain text or as categorized information. Such information may include the cause or reason for the error, the consequences the error causes, who is responsible or suited to fix the error, etc.

The communication arrangement 15a-g in each of the apparatuses is provided for communicating each of the error messages generated in that apparatus to all other ones of the apparatuses 11a-g, preferably in a standardized or unified manner. Preferably, the error messages are broadcast on the bus 17.

By such provision a flexible milking system is achieved. The error information is shared among the apparatuses 11a-g, which provides for a reliable operation. The different apparatuses 11a-g operates as modules of a distributed system or as intelligent nodes in a network.

In one version of the embodiment, for each of the error messages generated and communicated, at least one of the apparatuses 11a-g, depending on the nature and severity of the error, may be provided for pulling the error message and for informing a user of the milking system of the error and/or for performing an action related to the operation of the milking system. Information may be given as error status information that is simply entered into a database e.g. for an error having low severity, or as warnings or alarms e.g. for an error having higher severity. Alarms may be given visually, as a sound, or in any other conceivable manner such as e.g. as a vibration signal of a portable device.

For example, if the error has low severity a herd management system may be responsible for pulling the error message and for updating a database with the error information. If the error has high severity an apparatus for alarming may responsible for pulling the error message and for notifying a user of the milking system. If the user is remotely located the apparatus responsible for pulling and notifying may be an apparatus for communication remote communication that calls, pages, or sends a text message such as an SMS to the user.

Alternatively, or additionally, at least one of the apparatuses 11a-g, e.g. apparatus 11g, may be provided for pulling one of the error messages and for informing a user of the milking system of the error and/or for performing an action related to the operation of the milking system depending on the physical location 18 of that apparatus. For example, if one of the apparatuses is a milking machine, and it is in operation, the milking machine may be responsible for pulling the error message and for informing the user of the error.

Yet alternatively, or additionally, at least one of the apparatuses 11a-g may be provided for pulling one of the error messages and for informing a user of the milking system of the error and/or for performing an action related to the operation of the milking system depending on the capability of the apparatus e.g. for outputting information. For example, if the information should be in the form of a sound alarm an apparatus, e.g. apparatus 11c, having a sound alarm generator 19 should be responsible for pulling the error message and for informing the user via the sound alarm.

Each of the information that is given and each of the actions performed may depend on the time of the day.

Further, each of the apparatuses may comprise a number of sensors for sensing various quantities and/or conditions, and one or several of the apparatuses may be responsible for pulling an error message and for informing a user of the milking system of the error and/or for performing an action related to the operation of the milking system depending on the sensed quantities and/or conditions.

Preferably, each of the apparatuses comprises an arrangement 16a-g for determining whether that apparatus is still capable of operating properly in case an error message is received. Such arrangement may include the respective microprocessor 13a-g and further equipment including various sensors. If not, the apparatus is turned down, partly or completely. Further, each of the apparatuses that is turned down may be provided for generating an error message regarding its turn-down, and for communicating that error message to all other ones of the apparatuses.

Figure 3:
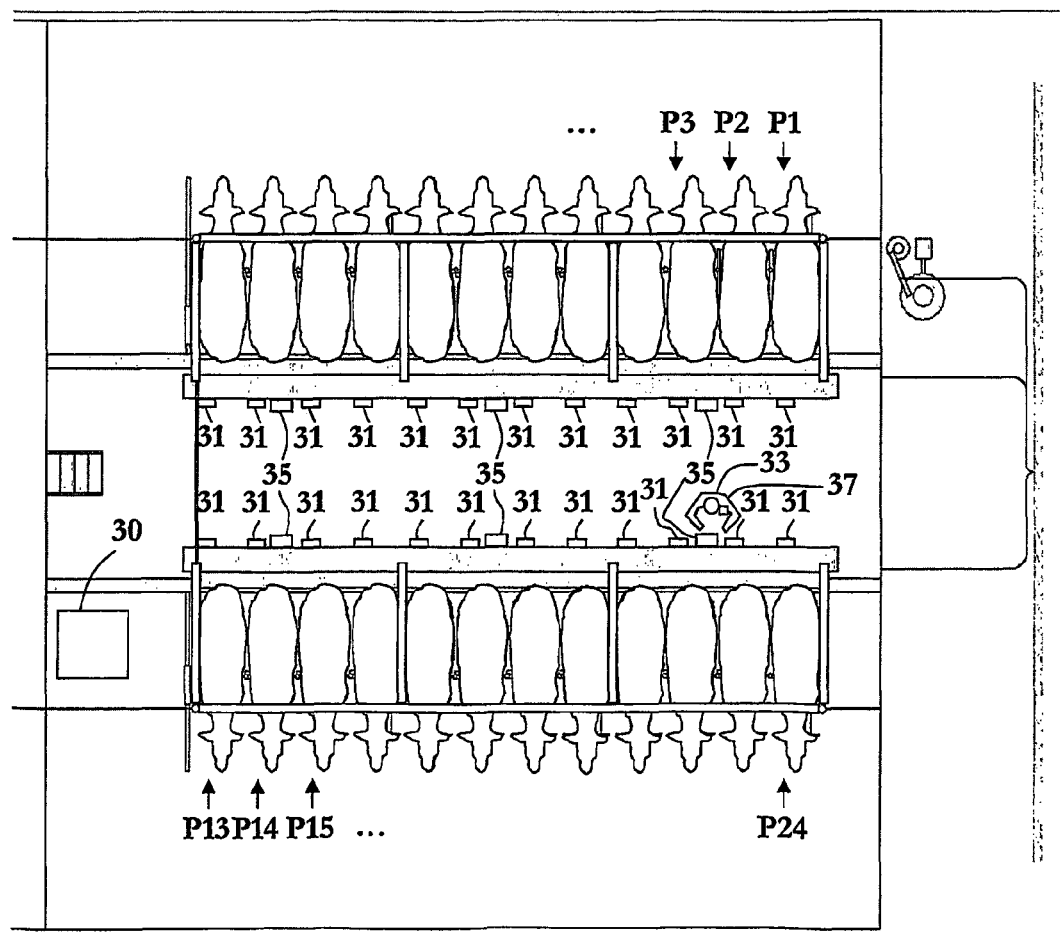
FIG. 3 illustrates, in a schematic top view, a milking system according to a further embodiment of the invention.

Turning now to FIG. 3, which shows a parallel stall milking system, a further embodiment of the invention is described. The parallel stall milking system, which may be exchanged for any other kind of milking system wherein a plurality of cows are milked simultaneously such as for example a Herringbone type of milking system, comprises a plurality of milking positions, in the illustrated case 24 milking positions P1-P24.

A processing and control device 30 is responsible for processing and controlling of the milking system, and comprises typically a microcomputer, suitable software, and a database including information about each of the cows milked by the milking system, such as e.g. when the respective cow was milked last time, when she was fed last time, her milk production, her health, her expected milking time, etc.

Each of the milking positions P1-P24 is provided with milk extraction equipment, i.e. teat cups that are attached manually to the teats of a cow and are connected to a source of vacuum to milk the cow, and a milk line for transporting milk to a receptacle (none of which being explicitly illustrated) as being common in the field.

Further, the milking system comprises, for each of the milking positions P1-P24, a terminal unit 31 of a first kind arranged at the milking position P1-P24 and provided for displaying information of a first kind of the milking position to a dairy farmer 33. For each group P1-P4, P5-P8, . . . of four adjacent milking positions P1-P24, a terminal unit 35 of a second kind is arranged at the group of adjacent milking positions, and provided for displaying information of a second, preferably more detailed, kind of the group of adjacent milking positions P1-P24 to the dairy farmer 33.

The terminal units 31, 35 may also be used as input devices for altering information and/or for controlling different processes with respect to the milking.

Further, a portable device 37, such as e.g. a PDA, to be held or worn by the dairy farmer 33 of the milking system is provided, wherein the portable device 37 may be used to obtain information and/or initiate actions.

The milking positions P1-P24, the processing and control device 30, the terminal units 31, 35, and the portable device 37 are each provided with a microprocessor, an error message generating system for generating error messages about errors that have occurred in the position, the device, or the unit, each of the error messages comprising information regarding the nature and severity of the error and being interpretable by all other ones of the milking positions P1-P24, the processing and control device 30, the terminal units 31, 35, and the portable device 37, and a device for communicating the error messages to all other ones of the milking positions P1-P24, the processing and control device 30, the terminal units 31, 35, and the portable device 37. To this end the milking positions P1-P24, the processing and control device 30, the terminal units 31, 35, and the portable device 37 are connected to each other in a network, which may be wireless or partly wireless, partly wired.

In such a milking system different ones of the terminal units 31, 35, and the portable device 37 may be responsible for pulling different error messages and for displaying them depending on nature, severity, and/or location of the error. The time at which the error occurred may also be a factor to consider. For instance, some errors should be communicated to the user via anyone of the terminal units 31, 35 during milking but not before or after milking.

It shall be appreciated that other aspects and alternative versions of the invention as described with reference to FIGS. 1 and 2 may likewise be applied in the embodiment of FIG. 3.

The above described concept may be generalized to include not only the generation and communication of error messages but also the generation and communication of other kind of messages, such as e.g. status messages.

According to the generalized concept a milking system comprising a plurality of dairy farm apparatuses is provided, wherein each of the apparatuses comprises a device for performing an action related to the operation of the milking system; a microprocessor; a general message generating system; and means for communication. The general message generating system is provided for generating messages about the operation of the apparatus, where each of the messages comprises information about e.g. errors that have occurred in, and/or actions that have been performed by, the apparatus and is interpretable by all other ones of the apparatuses, and the communication means is provided for communicating the messages to all other ones of the apparatuses.

In a further embodiment, each of the apparatuses may be intelligent so that its operation may not have to be controlled by e.g. a main controller, but many actions may be performed in response to messages received from other apparatuses. In such a milking system the demands on the main controller may be relaxed and the operation of the entire milking system may not be so heavily dependent on a main controller.

A method for implementing the above generalized concept is provided in accordance with a further aspect of the invention. The method comprises the steps of: in each of the apparatuses generating, by means of the message generating system in the apparatus, messages about the operation of the apparatus, and communicating the messages to all other ones of the of apparatuses, wherein each of the messages comprises information about errors that have occurred in, and/or actions that have been performed by, the apparatus and is interpretable by all other ones of the apparatuses.

Many of the various details and variations as described with reference to FIGS. 1-3 may, after suitable modifications, be applied in the generalized concept as described above.

The invention claimed is:

1. A milking system, comprising:
 a communications bus; and
 a plurality of different milking system apparatuses each wire-connected to each other via a wire connection to the communications bus,
 each of the apparatuses comprising
 i) a device configured to perform a milking-related operation in the milking system,
 ii) a microprocessor,
 iii) an error message generating system configured to generate an error message in the event of an error having occurred in the operation of the device, and
 iv) a communications device configured to transmit the error message, via the wire connection, to the communications bus, the communications bus configured to transmit the error message to all other apparatuses of the milking system connected to the communications bus, the communications device further configured to receive and interpret any error message transmitted by any of the other apparatuses,
 the error message generated by the error message generating system comprising an information of a nature of the error and an information of a severity of the error,
 each of the apparatuses being configured to i) evaluate the error message received via the communications bus and determine, based at least on the severity information of the received error message, whether a respective responsive action is appropriate, and ii) when the determination is that a responsive action is appropriate, cause the device of the apparatus to perform the responsive action,
 wherein the device of a first of said apparatuses is a vacuum source, the device of a second of said apparatuses is a milking machine, the device of a third of said apparatuses is a milking robot, the device of a fourth of said apparatuses is a gate system, the device of a fifth of said apparatuses is milk extraction equipment, the device of a sixth of said apparatuses is a herd management system, the device of a seventh of said apparatuses is a washing machine, the device of an eighth of said apparatuses is a cooling tank, the device of an ninth of said apparatuses is a communications apparatus, and the device of an tenth of said apparatuses is a feeding system,
 the vacuum source comprising a switch configured to any of switch on, switch off, and switch to a substitute vacuum source,
 the milking machine comprising a switch configured to switch off milking and to redirect milk,
 the milking robot comprising a robot arm configured to fetch and attach teat cups,
 the gate system comprising a control device configured to open and close gates for redirecting a milking animal,
 the milk extraction equipment comprising a switch configured to apply a vacuum for extracting milk from the milking animal,
 the herd management system comprising a module configured to adjust any of milking and feeding,
 the washing machine comprising a device for supplying cleaning fluid,
 the cooling tank comprising a device for increasing and decreasing temperature,
 the communications system comprising a device for initiating an alarm, and
 the feeding system comprising a feed supply device.

2. The milking system of claim 1, wherein the apparatus comprising the gate system is configured, depending on a value of the severity information of the received error message, causes the gate system to open and/or close a gate within the milking system.

3. The milking system of claim 1, wherein the responsive action of the communications system is to inform a user of the milking system of the error message received over the communications network.

4. The milking system of claim 1, wherein the error message generated by the error message generating system further includes an information of a physical location of the error, and each of the apparatuses are further configured to automatically interpret and evaluate said information of a physical location of the error.

5. The milking system of claim 1, wherein the apparatuses are configured to automatically determine, based on the received error message from one of the apparatuses, whether the one apparatus sending the error message is capable of operating properly.

6. The milking system of claim 5, wherein at least one other apparatus is configured to operate at a reduced operational capacity upon a determination that the one apparatus sending the error message is not capable of operating properly.

7. The milking system of claim 6, wherein the error message generating system of the at least one other apparatus is configured, upon a reduction of operational capacity responsive to the error message of the one apparatus, to automatically generate another error message corresponding to the reduction of the operational capacity.

8. The milking system of claim 1, wherein at least one of the apparatuses further determines, automatically, that a responsive action is appropriate based on a physical location of said at least one of the apparatuses.

9. The milking system of claim 1, wherein the communication system is configured for remote communication.

10. The milking system of claim 1, further comprising:
 a plurality of milking positions for simultaneously milking a plurality of milking animals, each position of the plurality of positions including,
 teat cups that are configured to attach to teats of one of the milking animals and connect to a source of vacuum to milk the one milking animal,
 a milk line for transporting the milk, and
 a first terminal unit arranged at the milking position and configured to display a first information of a first kind.

11. The milking system of claim 10, further comprising:
 a second terminal unit configured to display information of a second kind.

12. The milking system of claim 1, wherein each of the plurality of apparatuses is configured to automatically determine whether the error message transmitted over the communications network affects an operation respective to a particular apparatus, and further configured to automatically determine whether the error message affects an operation of the entire milking system.

13. A method for automatic fault management of a milking system that includes a plurality of different milking system apparatuses in communication with each other via a communications network, each of the apparatuses comprising a device for performing a different action in the milking system, an error message generating system, and a microcomputer provided with a microprocessor, memory, a communications device, and software stored on non-transitory storage for being executed on the microprocessor, the method comprising:
   automatically detecting an error in an operation of the device of a first of said apparatuses by way of the error generating system and microcomputer incorporated with the first of said apparatuses;
   automatically generating, via the error message generating system of the first of said apparatuses, an error message including an information of a nature of the error and an information of a severity of the error;
   automatically communicating the error message over the communications network;
   automatically receiving, from the communications network, the error message of said first of said apparatuses from the communications network at all others of said apparatuses;
   automatically determining, by way of the microcomputers at each of the others of said apparatuses, whether the severity information of the received error message exceeds a predetermined threshold respective to each of the others of said apparatuses;
   automatically causing, by way of the microcomputers at each of the others of said apparatuses, a respective responsive action to be performed by the respective device of said others of said apparatuses upon an automatic determination that the received error message exceeds the respective predetermined thresholds.

14. The method of claim 13, further comprising:
   automatically determining, at each of the others of said apparatuses, whether the received error affects an operation of the second of said apparatuses and/or an operation of the entire milking system.

15. The method of claim 13, wherein the responsive action respective to any one of the apparatuses is automatically determined based at least on a physical location of said one of the apparatuses.

16. The method of claim 13,
   wherein at least one of the apparatuses comprises a milking machine, and at least another of the apparatuses comprises a gate system comprising automated gates for directing the movement of milking animals, and
   wherein the claimed method further comprises:
   at the apparatus comprising a gate system, automatically causing gates to open and/or close depending on a value of the severity information of the received error message.

17. A control portion of a milking system, comprising:
   a plurality of different milking system apparatuses connectable to each other via a communications network, each of the apparatuses comprising
   i) a device configured to automatically perform a milking-related operation in the milking system,
   ii) a microprocessor, memory, and non-transitory storage having software stored thereon that is executable by the microprocessor,
   iii) an error message generating system configured to automatically generate an error message in the event of an error having occurred in the operation of the device, and
   iv) a communications device configured to automatically transmit the error message over the communications network to all other apparatuses of the milking system, and to automatically receive and interpret any error message transmitted by any of the other apparatuses,
   the error message generated by the error message generating system comprising an information of a nature of the error and an information of a severity of the error,
   each of the apparatuses being configured to i) automatically evaluate the error message received via the communications network and automatically determine, based at least on the severity information of the received error message, whether a respective responsive action is appropriate, and ii) when the automatic determination is that a responsive action is appropriate, automatically cause the device of the apparatus to perform the responsive action,
   wherein the device of a first of said apparatuses is a vacuum source, the device of a second of said apparatuses is a milking machine, the device of a third of said apparatuses is a milking robot, and the device of a fourth of said apparatuses is a gate system.

18. The control portion according to claim 17, wherein the apparatus comprising the gate system is configured, depending on a value of the severity information of the received error message, automatically causes the gate system to open and/or close a gate within the milking system.

19. The control portion according to claim 18, wherein the error message generated by the error message generating system further includes an information of a physical location of the error, and each of the apparatuses are further configured to automatically interpret and evaluate said information of a physical location of the error.

20. The control portion according to claim 18, wherein at least one of the apparatuses is configured, based on the automatic determination based on the received error message, to automatically perform a shut down of the apparatus and automatically generate a new error message to all remaining apparatuses, the new error message comprising information regarding the shut down of the at least one apparatus.

* * * * *